US007441405B2

(12) United States Patent
Aarestad et al.

(10) Patent No.: US 7,441,405 B2
(45) Date of Patent: Oct. 28, 2008

(54) CYLINDER WITH INTERNAL PUSHROD

(75) Inventors: Robert A. Aarestad, Washington, IL (US); Paul D. Hagen, Yorkville, IL (US); John J. Krone, Peoria, IL (US); Jason L. Brinkman, Peoria, IL (US); George M. Romack, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 127 days.

(21) Appl. No.: 11/278,351

(22) Filed: Mar. 31, 2006

(65) Prior Publication Data

US 2007/0227133 A1 Oct. 4, 2007

(51) Int. Cl.
*F16D 31/02* (2006.01)
*F01B 31/00* (2006.01)

(52) U.S. Cl. .......................................... 60/413; 92/108

(58) Field of Classification Search .................... 92/51, 92/108, 110, 134; 60/413, 414; 91/169
See application file for complete search history.

(56) References Cited

U.S. PATENT DOCUMENTS

| | | | |
|---|---|---|---|
| 3,779,135 | A | 12/1973 | Sugimura |
| 3,869,861 | A | 3/1975 | Case |
| 4,046,270 | A | 9/1977 | Baron et al. |
| 4,174,656 | A | 11/1979 | Duffey |
| 4,216,703 | A | 8/1980 | Schoeneweis |
| 4,608,913 | A | 9/1986 | Bonafous |
| 4,738,101 | A | 4/1988 | Kubik |
| 5,048,292 | A | 9/1991 | Kubik |
| 5,417,392 | A | 5/1995 | Wyatt |
| 5,522,212 | A | 6/1996 | Kubik |
| 5,778,669 | A | 7/1998 | Kubik |
| 5,916,139 | A | 6/1999 | Tieben |
| 6,370,874 | B1 | 4/2002 | Rausch et al. |

OTHER PUBLICATIONS

An Energy Recovery System for A Hydraulic Crane C03700 IMechE 2001, Proceedings of 2002 ASME International Mechanical Engineering Congress & Exposition 11/17-22, New Orleans, LA UMC-019.

*Primary Examiner*—Michael Leslie
(74) *Attorney, Agent, or Firm*—D. James Barnes; Steven G. Kibby

(57) ABSTRACT

A cylinder assembly is disclosed. The cylinder assembly may include a cylinder body having an internal cavity therein and a piston and rod assembly disposed for axial movement within the internal cavity of the cylinder body. The piston and rod assembly may have an axial passage extending therein. The cylinder assembly may further include a tubular element received within the axial passage of the piston and rod assembly. At least a portion of the tubular element may extend out of the axial passage and into the internal cavity of the cylinder body between the axial passage and a wall of the cylinder body.

22 Claims, 6 Drawing Sheets

CONTROLLER
10
30
42
56
14
18
22
38
A
B
34a
34b
114
119a
119b
136
136a
136b
140
120
115
105
106
112
132
104
104a
104b
104c
108
116
128
144
144a
144b
26

CYLINDER WITH INTERNAL PUSHROD

TECHNICAL FIELD

The present invention relates generally to fluid actuators and, more particularly, to fluid-actuated cylinders.

BACKGROUND

Many work machines, such as earthworking machines or the like, include fluid actuators, such as hydraulic cylinders, which may be used by the earthworking machines to lift, lower, or otherwise move earthworking equipment. Such fluid actuators may experience many extension-retraction cycles during a work period. For example, a hydraulic cylinder on an earthworking machine may be used to periodically lift and lower a work implement. The work implement may be raised by applying pressurized fluid to the hydraulic cylinder, and the work implement may be lowered under its own weight by releasing the pressure supplied by the fluid. Again, the work implement may be raised by applying pressurized fluid to the cylinder, and again the work implement may be lowered by releasing the fluid from the cylinder. Each time the work implement is raised, potential energy is created within the work implement system, and each time the work implement is lowered by releasing pressure from the cylinder, the potential energy is lost.

In order to reduce energy losses associated with the cyclical lifting and lowering of a work implement, various devices have been proposed to (i) recover and store some of the energy that is released when the work implement is lowered, and (ii) subsequently use the stored energy to raise the work implement during its next lift cycle. For example, in an article entitled "An Energy Recovery System for a Hydraulic Crane," Xingui Liang and Tapio Virvalo proposed an energy recovery system for reducing energy losses associated with the operation of a crane. Xingui Liang & Tapio Virvalo, *An Energy Recovery System for a Hydraulic Crane*, Proceedings of the Inst. Mech. Eng'r Part C, J. Mech. Eng'g Science, Vol. 215, no. 6, 737-44 (2001). The proposed Liang system includes a hydraulic lift cylinder connected with the joint of a crane. The lift cylinder is fed by a hydraulic pump, which supplies pressurized fluid to the lift cylinder for lifting the crane. In addition, the proposed system includes two additional assistant cylinders connected with an accumulator. The assistant cylinders share the load of the crane with the lift cylinder. When the boom is lowered, the assistant cylinders charge the accumulator. When the boom is to be raised, the hydraulic pump feeds pressure to the lift cylinder and the accumulator feeds stored pressure back to the assistant cylinders.

Prior systems may suffer from various disadvantages. For example, adding additional separate cylinders to a lift system may increase the cost of the lift system. Moreover, application of additional cylinders to an existing lift system may not be feasible due to space, configuration, or other design constraints. Further, the additional cylinders in prior proposed systems may be constrained to receiving supply pressure from an accumulator and may, therefore, be limited to applying only stored energy to the lift system. Thus, the amount of lift force provided by such additional cylinders may be limited by the pressure storage capacity of an associated accumulator.

The present invention is directed to overcoming one or more disadvantages associated with prior fluid actuating systems.

SUMMARY OF THE INVENTION

According to one aspect of the present invention, a cylinder assembly may be provided. The cylinder assembly may include a cylinder body including an internal cavity therein, and a piston and rod assembly disposed for axial movement within the internal cavity of the cylinder body. The piston and rod assembly may have an axial passage extending therein. The cylinder assembly may further include a tubular element received within the axial passage of the piston and rod assembly. At least a portion of the tubular element may extend out of the axial passage and into the internal cavity of the cylinder body between the axial passage and a wall of the cylinder body.

According to another aspect of the invention, a fluid system may be provided. The fluid system may include a cylinder body having an internal cavity therein, and a piston and rod assembly disposed for axial movement within the internal cavity of the cylinder body. The piston and rod assembly may have an axial passage extending therein and may include a piston having a rod side and a head side. The fluid system may further include a tubular element received within the axial passage of the piston and rod assembly, the tubular element having a fluid passage therein. At least a portion of the tubular element may extend out of the axial passage and into the internal cavity of the cylinder body between the axial passage and a wall of the cylinder body. A source of fluid in fluid communication with the head side of the piston may also be provided. The fluid system may also include a source of fluid in fluid communication with the axial passage of the piston and rod assembly through the fluid passage of the tubular element.

According to a further aspect of the invention, a method for actuating a fluid actuator including a cylinder body with an internal cavity therein, and a piston and rod assembly having an axial passage extending therein and disposed for axial movement within the internal cavity of the cylinder body may be provided. The method may include creating a first urging force on the piston and rod assembly in an axial direction by directing pressurized fluid from a fluid source into the cylinder body and upon a first side of a piston of the piston and rod assembly; directing fluid from a fluid source into the axial passage of the piston and rod assembly as the piston and rod assembly moves in the axial direction; and preventing the pressurized fluid that is creating the first urging force on the piston and rod assembly from substantially communicating within the cylinder body with the fluid within the axial passage of the piston and rod assembly.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments or features of the invention and, together with the description, serve to explain the principles of the invention. In the drawings.

Although the drawings depict exemplary embodiments or features of the present invention, the drawings are not necessarily to scale, and certain features may be exaggerated in order to better illustrate and explain the present invention. The exemplifications set out herein illustrate exemplary embodiments or features of the invention and such exemplifications are not to be construed as limiting the scope of the invention in any manner.

DETAILED DESCRIPTION

Reference will now be made in detail to embodiments or features of the invention, examples of which are illustrated in the accompanying drawings. Wherever possible, the same or corresponding reference numbers will be used throughout the drawings to refer to the same or corresponding parts.

Figure 1:
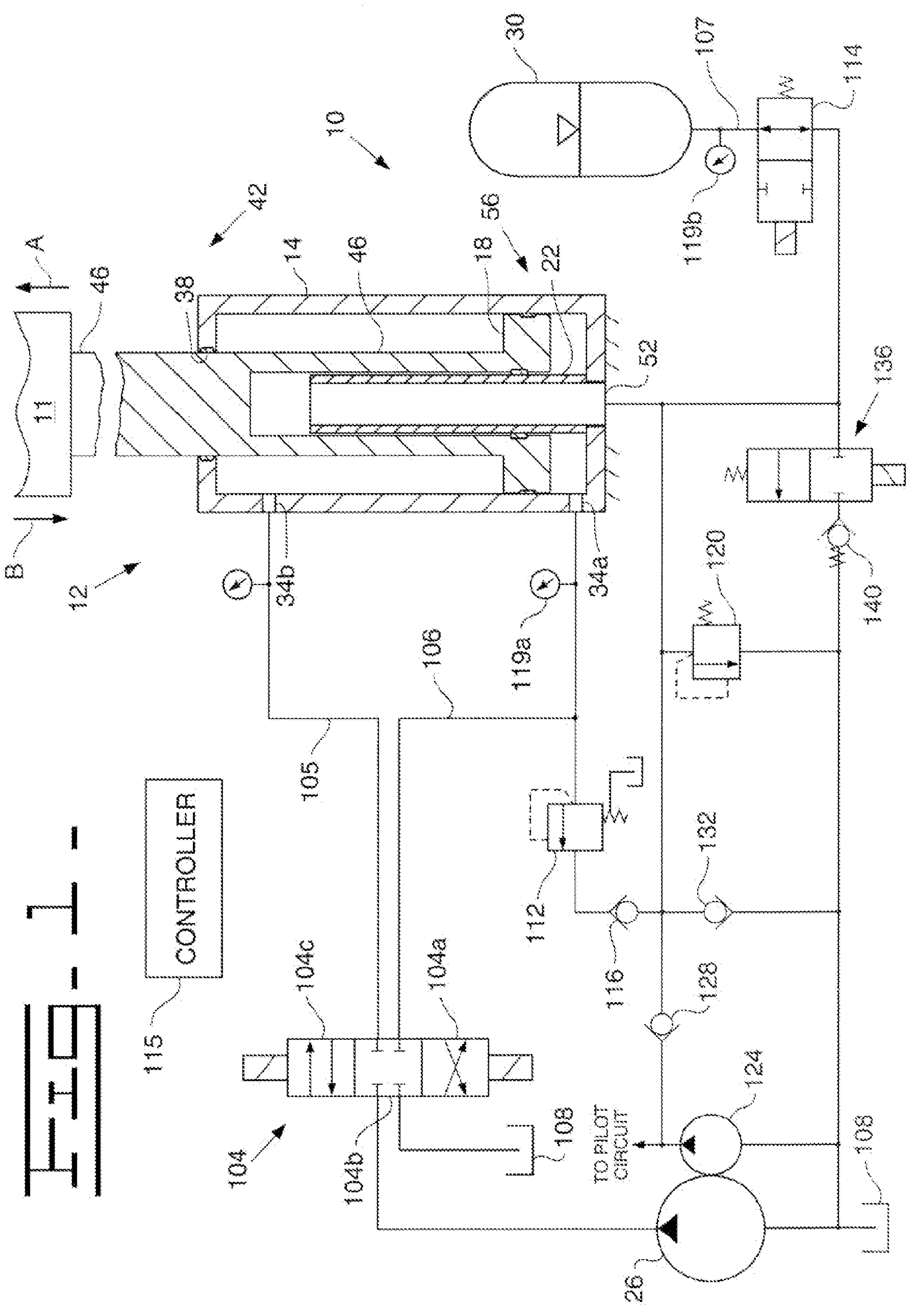
FIG. 1 is a partial diagrammatic and partial schematic view of an exemplary fluid actuation system in accordance with the present invention.

Referring to FIG. 1, an exemplary fluid actuation system 10 is shown. The fluid actuation system 10 may be used, for example, on earthworking machines, such as loaders, excavators, mining shovels, or the like, to, for example, lift and lower a work implement (generally indicated with reference number 11 in FIG. 1), which may be attached to the piston and rod assembly 18 of the actuation system 10. The fluid actuation system 10 may include a cylinder arrangement 12 having a cylinder body 14, a piston and rod assembly 18 disposed within the cylinder body 14, and a tubular element 22. The system 10 may further include a first source of pressurized fluid 26, and a second source of pressurized fluid 30.

Figure 2:
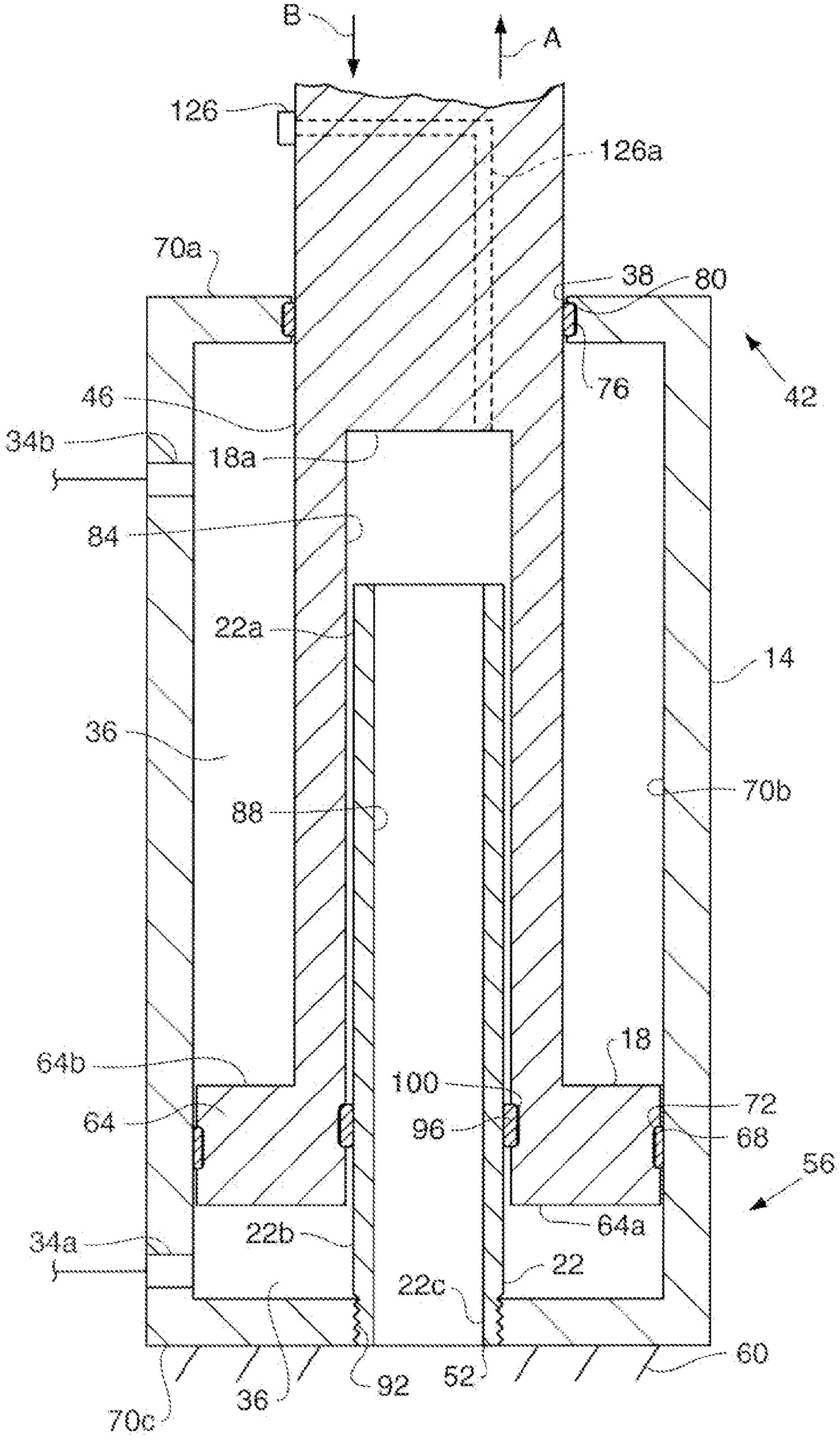
FIG. 2 is a diagrammatic side profile cutaway view of a cylinder assembly in accordance with the present invention

With reference to FIG. 2, the system 10 may include a cylinder body 14 having first and second fluid ports 34*a*, 34*b* for supplying and relieving pressurized fluid to and from an internal cavity 36 within the cylinder body 14. The cylinder body 14 may also include an opening 38 at a first end portion 42 of the cylinder body 14 for passage of a rod member 46 therethrough. The cylinder body 14 may further include an opening or port 52 at a second end portion 56 of the cylinder body 14 for passage of a working fluid therethrough, as explained in greater detail below. In one embodiment, the cylinder body 14 may be mounted to an earthworking machine, generally indicated in FIG. 2 by the lines 60.

A piston and rod assembly 18 may be disposed within the internal cavity 36 of the cylinder body 14 and may be arranged for axial movement within the internal cavity 36. The piston and rod assembly 18 may include a piston member 64 and a rod member 46 connected with the piston member 64. The rod member 46 extends out of the internal cavity 36 of the cylinder body 14 and may be connected with a work implement 11 (FIG. 1), such as a work bucket or the like. A seal member 76 may be disposed between the rod 46 and the opening 38 of the cylinder body 14 and may be seated in a seal groove 80 formed in a wall 70*a* of the cylinder body 14. An additional seal member 68 may be disposed between the piston 64 and a wall 70*b* of the cylinder body 14 and may be seated in a seal groove 72 formed in the outer surface of the piston 64.

The piston and rod assembly 18 may have an axial passage 84 formed therein. For example, as shown in FIG. 2, the piston 64 and the rod 46 may have a central axial bore therein to form the axial passage 84.

The fluid actuation system 10 may further include a tubular element 22 received within the axial passage 84 of the piston and rod assembly 18. The tubular element 22 may have a fluid passage 88 therein for delivering fluid to and from the axial passage 84. The tubular element 22 may be a length of material, such as steel tubing, that provides one or more tubes, lumina, or channels for delivering fluid to and from the axial passage 84 of the piston and rod assembly 18. As shown in FIG. 2, a first portion 22*a* of the tubular element 22 is slidably received within the axial passage 84 of the piston and rod assembly 18, and an intermediate portion 22*b* of the tubular element 22 extends outwardly from the axial passage 84 between a head side 64*a* of the piston 64 and an end wall 70*c* of the cylinder body 14. The first portion 22*a* of the tubular element 22 may sealingly engage an inner surface of the piston and rod assembly 18. For example, a seal member 96 may be disposed between the tubular element 22 and a wall of the axial passage 84 and may be seated in a seal groove 100 formed in an inner wall or structure of the piston and rod assembly 18. The seal member 96 may be operable to prevent working fluid within the axial passage 84 of the piston and rod assembly 18 from substantially communicating with working fluid disposed in other portions of the internal cavity 36 of the piston and rod assembly 18. For example, the seal member 96 may be operable to substantially isolate working fluid within the axial passage 84 from pressurized fluid being applied to the internal cavity 36 through port 34*a* and/or port 34*b*.

A second portion 22*c* of the tubular element 22 may be connected with the cylinder body 14, for example at the end wall 70*c*. It should be appreciated that the second portion 22*c* of the tubular element 22 may be connected with the cylinder body 14 in a variety of ways. For example, the tubular element 22 and the cylinder body 14 may be connected via a threaded engagement 92, wherein threads on the tubular element 22 engage complimentary threads on the cylinder body 14. Alternatively or additionally, the tubular element 22 may be welded, press-fit, integrally formed with, or connected with the cylinder body 14 in a variety of other ways known in the art.

With reference to FIG. 1, the source of fluid 26, such as a hydraulic fluid pump, may be fluidly connected with the cylinder body at ports 34*a*, 34*b* and may provide pressurized fluid to the ports 34*a*, 34*b* through a valve member 104, such as an electro-hydraulic valve. The electro-hydraulic valve 104 shown in FIG. 1 is a three position proportional valve and may be controlled to selectively (i) supply a desired flow of pressurized fluid from the pump 26 to the port 34*a* of the cylinder body 14; (ii) block pressurized fluid from passing from the pump 26 to the cylinder body 14; and (iii) supply a desired flow of pressurized fluid from the pump 26 to the port 34*b* of the cylinder body 14.

For example, when the valve 104 is moved away from position 104*b* and toward position 104*a*, the pump 26 supplies pressurized fluid to the port 34*a* of the cylinder body 14. The pressurized fluid operates against the head side 64*a* of the piston and rod assembly 18, thus causing the piston and rod assembly 18 to move axially in the direction of arrow A in FIGS. 1 and 2. As the piston and rod assembly 18 is moved in the direction of arrow A within the cylinder body 14, fluid is discharged from the cylinder body 14 at the port 34*b* and is passed through the valve 104 into a fluid reservoir or tank 108. When the valve 104 is moved away from position 104*b* and toward position 104*c*, the pump 26 supplies pressurized fluid to the port 34*b* of the cylinder body 14. The pressurized fluid operates against the rod side 64*b* of the piston and rod assembly 18, thus forcing the piston and rod assembly to move in the direction of arrow B in FIGS. 1 and 2. As the piston and rod assembly 18 is moved in the direction of arrow B within the cylinder body 14, fluid is discharged from the cylinder body 14 at the port 34*a* and is passed through the valve 104 into the tank 108.

Referring to FIGS. 1 and 2, the tubular element 22 may be fluidly connected, for example at opening 52, with a source of fluid 30, such as an accumulator. When the piston and rod assembly 18 is moved in the direction of arrow B (for example, when the supply of pressurized fluid from the pump 26 to port 34*a* is eliminated or reduced and the piston and rod assembly 18 is forced down by the weight of an attached work implement), fluid disposed within the axial passage 84 is discharged from the axial passage 84 through the fluid passage 88 of the tubular element 22 and forced into the accumulator 30. As the fluid is forced into the accumulator 30, compressed gas (or other spring means) within the accumulator 30 is compressed further, and the internal pressure within the accumulator 30 is increased. It should be appreciated that the accumulator pressure may be transmitted through the pressurized fluid to operate against an inner structure or wall 18*a* of the piston and rod assembly 18, thereby directing a force against the piston and rod assembly 18 in the direction of arrow A. Thus, pressurized fluid from the accumulator 30 may direct a force against the piston and rod assembly 18 to supplement the upward force that is directed against the piston and rod assembly 18 by pressurized fluid from the pump 26 (i.e., when the valve 104 is moved toward position 104*a*). Each time the piston and rod assembly 18 is moved in the direction of arrow B (e.g., when a work implement connected with the piston and rod assembly 18 is lowered, for example under its own weight), energy is stored within the accumulator 30. This energy may be transmitted from the accumulator 30 through the pressurized working fluid to direct a supplemental force against the piston and rod assembly 18 in the direction of arrow A, thereby decreasing the amount of energy needed to be supplied by the pump 26 when the piston and rod assembly 18 needs to be moved in the direction of arrow A (e.g., when the work implement needs to be lifted again).

Referring to FIG. 1. the fluid actuation system 10 may further include a control valve 112, such as a relief valve, fluidly connected between the pump 26 and the axial passage 84 of the piston and rod assembly 18 (and/or the accumulator 30). The control valve 112 may be, for example, an adjustable relief valve configured and arranged to prevent or restrict fluid from passing between the pump 26 and the axial passage 84 of the piston and rod assembly 18 when the pressure of the fluid from the pump 26 meets or is below an adjustable threshold pressure. Moreover, the control valve 112 may be configured to allow fluid to pass between the pump 26 and the axial passage 84 of the piston and rod assembly 18 when (a) the pressure of the fluid from the pump 26 meets or exceeds a threshold pressure and (b) the pressure of the fluid from the accumulator 30 is less than the pressure of the fluid from the pump 26.

The fluid actuation system 10 of FIG. 1 may also include a second control valve 114, such as a proportional electro-hydraulic valve, connected between the accumulator 30 and the axial passage 84 of the piston and rod assembly 18. The fluid actuation system 10 may further include pressure sensors 119*a*, 119*b*, which may be fluidly connected to a line 106 between the pump 26 and the port 34*a* of the cylinder body 14 (sensor 119*a*) and to a line 107 between the accumulator 30 and the axial passage 84 of the piston and rod assembly 18 (sensor 119*b*). The pressure sensors 119*a*, 119*b* may be electrically connected with a controller 115, and the controller may be electrically connected with the control valve 114 to control the operation of the control valve 114. For example, when (a) the pressure in line 106 exceeds a predetermined threshold pressure (e.g., a pressure greater than the pressure required to open the control valve 112) and (b) the pressure in line 107 is less than the pressure in line 106, then the controller may be operable to close the control valve 114 to prevent pressurized fluid from line 106 from entering the accumulator 30.

In one example, when a large lift force must be applied to the piston and rod assembly 18 (for example, to lift a fully loaded work implement), the pump 26 may be controlled to provide a very high pressure fluid (e.g., at a pressure greater than the pressure required to open the control valve 112) to the cylinder body 14 via port 34*a*. Moreover, since under such circumstances the pressurized fluid from the accumulator 30 may not provide the desired amount of pressure to the axial passage 84 of the piston and rod assembly 18, the control valve 112 may permit the very high pressure fluid from the pump 26 to be communicated to the axial passage 84 of the piston and rod assembly 18, thereby increasing the overall lifting force applied to the piston and rod assembly 18. Further, the controller 115 may cause the control valve 114 to close, thereby preventing the very high pressure fluid from the pump 26 from entering the accumulator 30.

Figure 3:
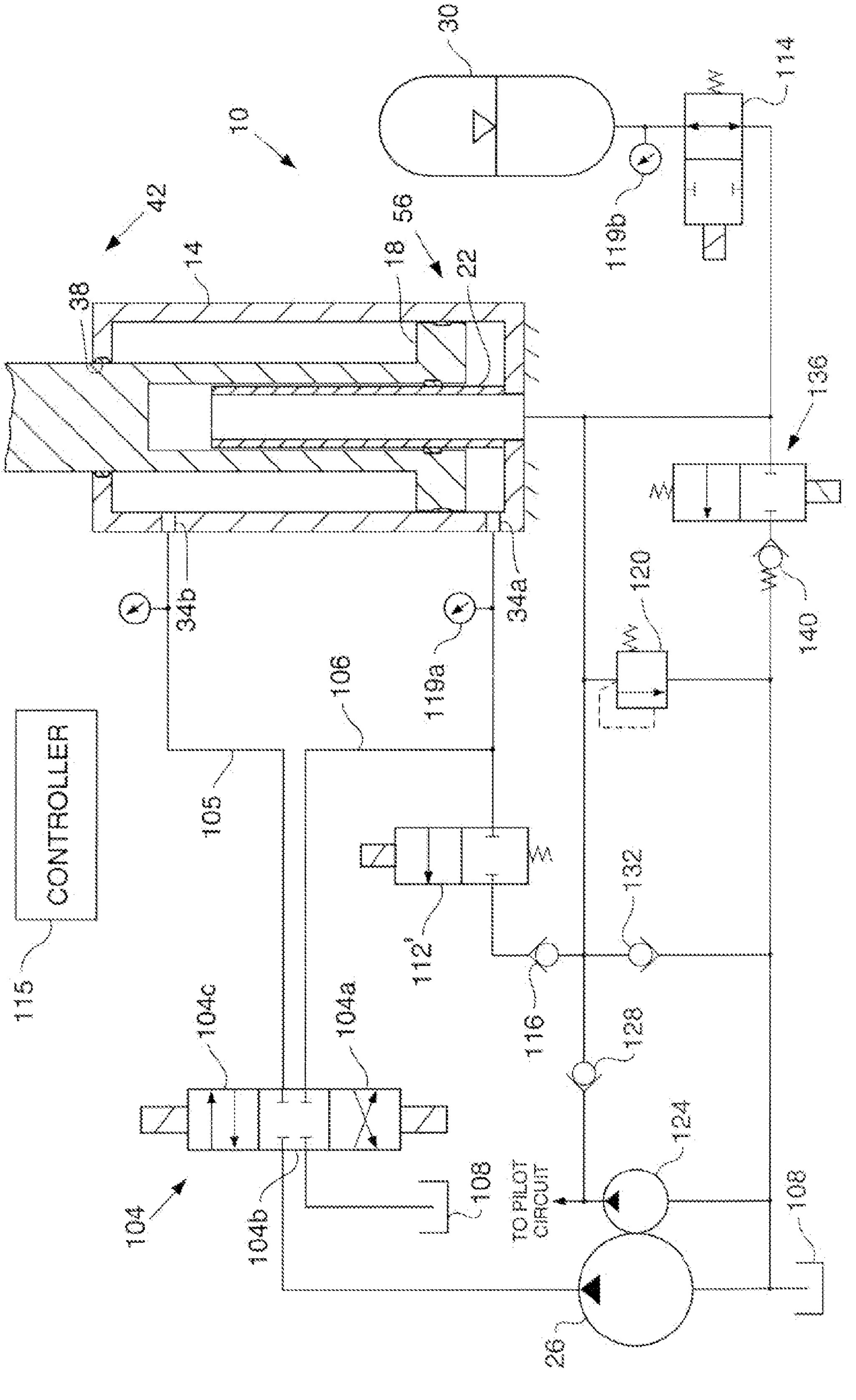
FIG. 3 is a partial diagrammatic and partial schematic view of a second exemplary fluid actuation system in accordance with the present invention.

It should be appreciated that the control valve 112 shown in FIG. 1 may be replaced by a proportional electro-hydraulic valve arrangement 112' (FIG. 3) that is operable to selectively allow fluid communication between the pump 26 and the axial passage 84 of the piston and rod assembly 18. For example, when the pressure sensor 119*a* transmits a signal to the controller indicating that the pressure of fluid within fluid line 106 meets or is below a threshold pressure, the controller 115 may be operable to keep the control valve 112' closed. Moreover, when the sensor 119*a* indicates that the pressure of fluid within the fluid line 106 meets or exceeds a threshold pressure, the controller may be operable to open the control valve 112' a desired amount to allow fluid to pass between the pump 26 and the axial passage 84 of the piston and rod assembly 18. The controller may also be operable to close the valve 114 so that the fluid passing between the pump 26 and the axial passage 84 is not diverted to the accumulator 30.

The control valve 112' may be controlled selectively by an operator of the fluid actuation system 10 so that fluid from the fluid source 26 may be selectively applied, as desired, to the axial passage 84 of the piston and rod assembly 18 and/or the accumulator 30. For example, if the operator would like to apply additional lift force to the piston and rod assembly 18, the operator may selectively open the control valve 112' to allow pressurized fluid from the pump 26 to be supplied to the axial passage 84 of the piston and rod assembly 18 (assuming the pressure of fluid from the pump 26 exceeds the pressure of fluid from the accumulator 30). It should be appreciated that the controller 115 may be operable to close the control valve 114 during such operations, either automatically or upon activation by the operator. It should further be appreciated that when fluid from the pump 26 is supplied to both the port 34*a* and to the axial passage 84 of the piston and rod assembly (through the control valve 112, 112'), (a) the total lift force exerted on the piston and rod assembly 18 by pressurized fluid from the pump 26 increases, and (b) the lift speed of the piston and rod assembly 18 in the direction of arrow A decreases (since the volume of fluid required to be provided internally to the cylinder body 14 by the pump 26 to lift the piston and rod assembly 18 increases). Thus, an operator may desire to selectively operate the control valve 112' (and the control valve 114), for example, when (a) a large lift force is required to lift (or otherwise move) the piston and rod assembly 18, or (b) the operator desires to have more precise control over the lift speed of the piston and rod assembly 18 (e.g., when a slower lift speed is desired).

Referring to FIG. 1, the fluid actuation system 10 may further include a valve 116, such as a one-way poppet valve, that is operable to prevent fluid from passing from the axial passage 84 of the piston and rod assembly 18 (or the accumulator 30) to the port 34*a* of the cylinder body 14 (or the tank 108).

The fluid actuation system 10 may also include one or more valves 120, such as a pressure relief valve, that may be operable to allow fluid from (i) the pump 26 (through the control valve 112, 112'), (ii) the axial passage 84 of the piston and rod assembly 18, and/or (iii) the accumulator 30, to pass to the tank 108 if the pressure of the fluid meets or exceeds a threshold relief pressure.

The fluid actuation system 10 may further include equipment for charging and discharging the accumulator 30 during start-up and shut down of the fluid actuation system 10. For example, and with reference to FIG. 1, the system 10 may include a pilot pump 124 fluidly connected to the accumulator 30 and the axial passage 84 of the piston and rod assembly 18. Upon start-up, the pump 124 may provide pressurized fluid to charge the accumulator 30 and, if necessary, fill the axial passage 84 of the piston and rod assembly 18. During an initial fill operation, air may be bled from the axial passage 84 via a bleed valve 126 (FIG. 2) disposed on the rod 46 outside of the cylinder body 14. The bleed valve 126 may fluidly communicate with the internal passage 84 of the piston and rod assembly via an internal lumen 126*a* within the piston and rod assembly 18. A valve 128 (FIG. 1), such as a one-way poppet valve, may be disposed downstream of the pilot pump 124 and may be operable to prevent fluid from flowing toward the pilot pump 124 during normal operation of the fluid actuation system 10.

In alternative embodiments (FIGS. 4 and 5), the axial passage 84 and the accumulator 30 may be filled and charged directly by fluid from the main pump 26. In such an embodiment, the system 10 may include an additional valve 144, such as a proportional electro-hydraulic valve, that may be opened (position 144*a*) to fill the axial passage 84 and to charge the accumulator 30, as desired.

A valve 132 (FIGS. 1, 3, and 4), such as a one-way poppet valve, may also be provided to allow make-up fluid to pass from a fluid reservoir or tank 108 to the axial passage 84 of the piston and rod assembly as needed. For example, if the fluid actuation system 10 is first operated before the axial passage 84 of the piston and rod assembly 18 is filled by the pilot pump 124 (or before the accumulator 30 is charged), when the piston and rod assembly 18 is first raised (in the direction of arrow A), for example as a result of pressurized fluid being provided by the pump 26 to the port 34*a*, the axial passage 84 may draw make-up fluid from the tank 108 through the valve 132. Moreover, when the piston and rod assembly 18 is first lowered (in the direction of arrow B), the fluid within the axial passage 84 of the piston and rod assembly 18 will be forced into the accumulator 30 to charge the accumulator 30.

Figure 4:
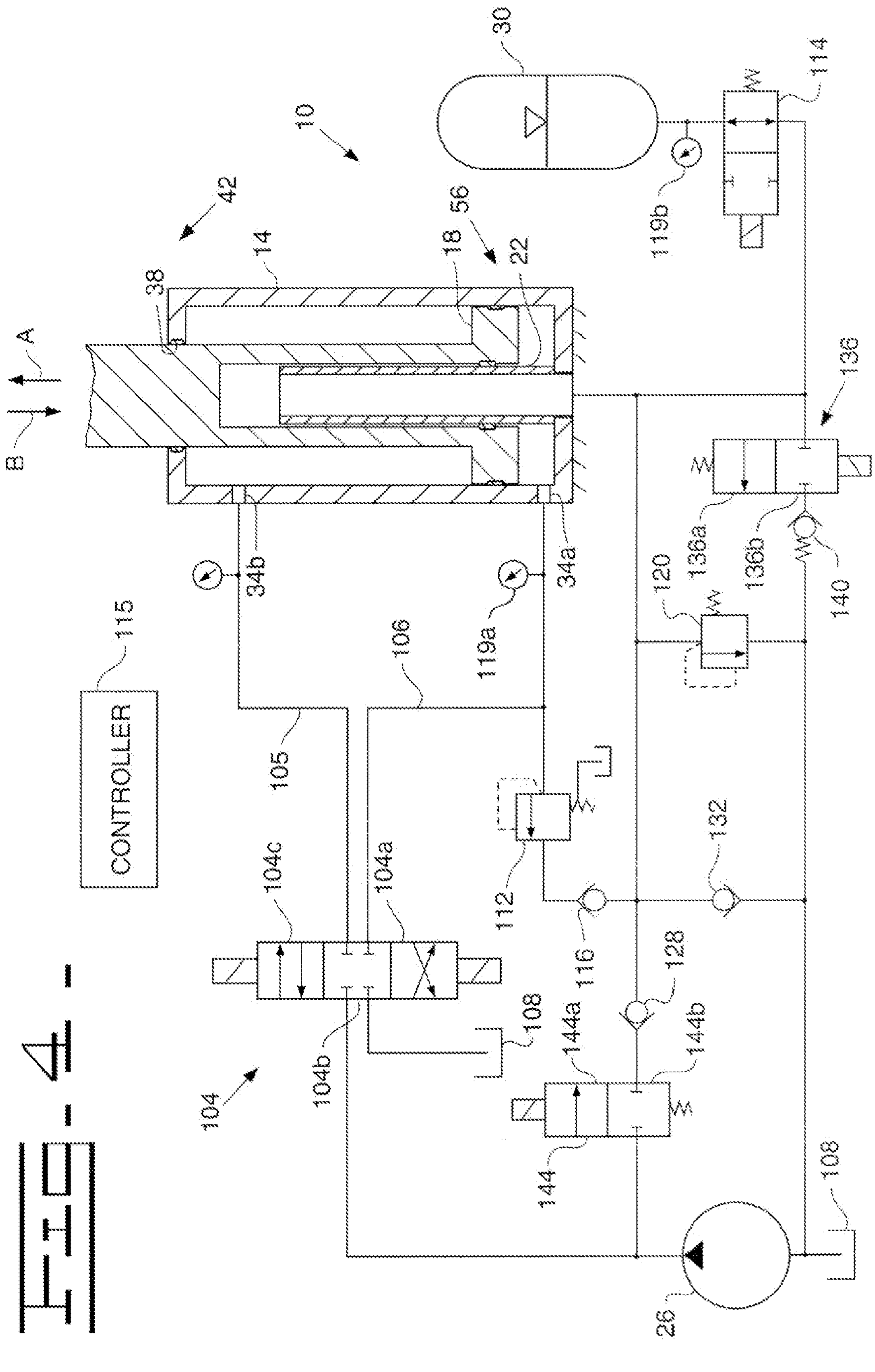
FIG. 4 is a partial diagrammatic and partial schematic view of a third exemplary fluid actuation system in accordance with the present invention.

Referring to FIG. 4, the system 10 may further include a valve arrangement 136, such as a proportional electro-hydraulic valve, that may be closed (position 136*b*) after start up of the system 10 so that the accumulator 30 may be able to build up pressure. The valve 136 may be opened (position 136*a*) upon shut down of the system 10 to allow fluid pressure to be relieved from the accumulator 30. A pressure check arrangement 140, such as a spring loaded one-way poppet valve, may also be included downstream of the valve 136 to ensure that a threshold pressure is maintained within the accumulator 30 and the axial passage 84 of the piston and rod assembly 18 during shut down.

Figure 5:
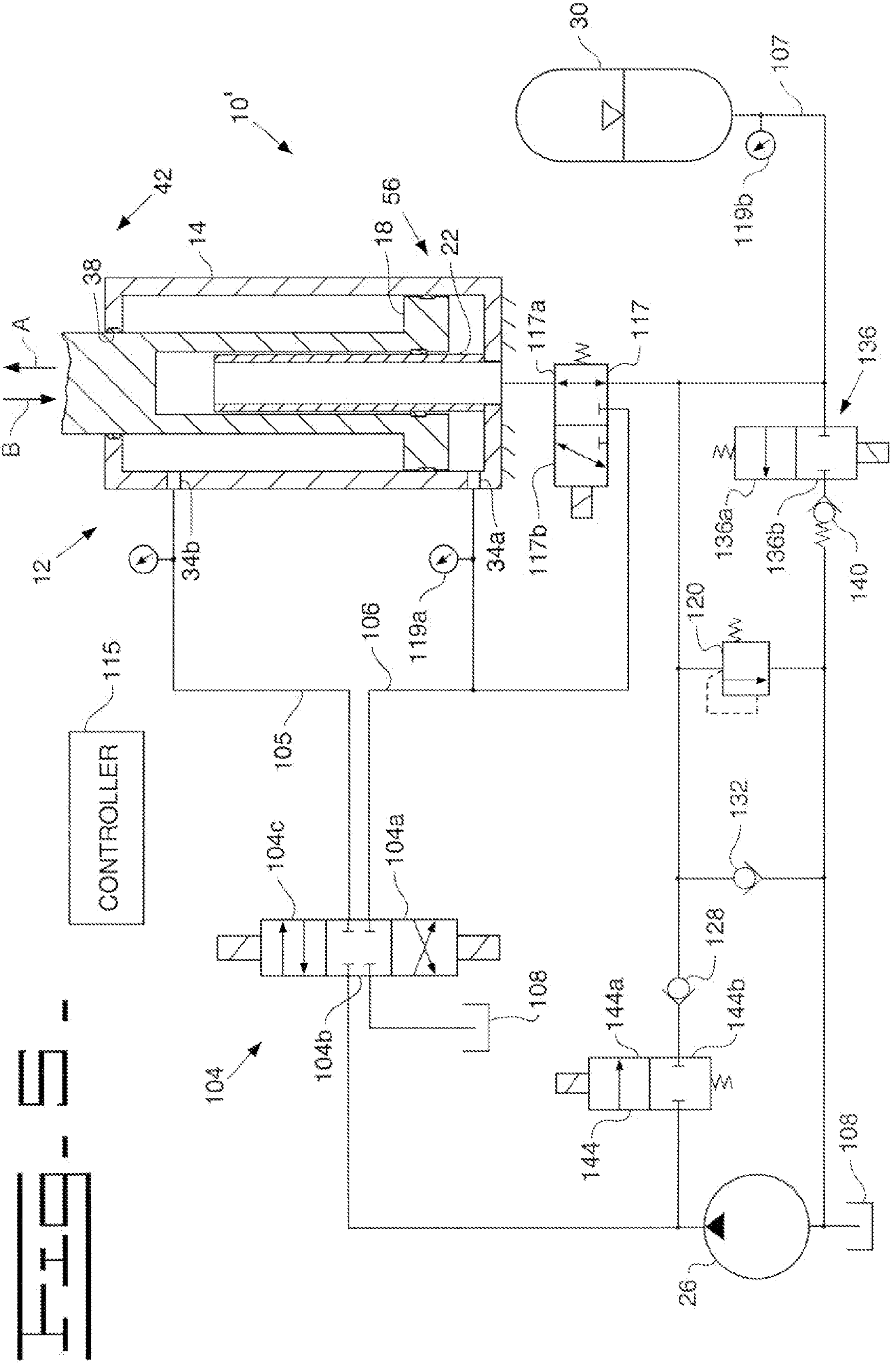
FIG. 5 is a partial diagrammatic and partial schematic view of a fourth exemplary fluid actuation system in accordance with the present invention.

Referring to FIG. 5, an alternative embodiment of an exemplary fluid actuation system 10' is shown. The embodiment of FIG. 5 is configured much like the embodiment shown in FIG. 4, but includes an alternative control valve arrangement 117, such as a proportional electro-hydraulic valve, and does not include the control valve 114. The control valve 117 may be electrically connected to, and controlled by, the controller 115. The control valve 117 is fluidly connected between the pump 26 and the axial passage 84 of the piston and rod assembly 18 and is further fluidly connected between the accumulator 30 and the axial passage 84. When the valve 117 is in position 117*a*, for example during normal operation of the fluid actuation system 10', the valve 117 allows fluid communication between the accumulator 30 and the axial passage 84 of the piston and rod assembly 18 and blocks fluid communication between the line 106 and the axial passage 84. When the valve 117 is moved into position 117*b*, for example by the controller 115, fluid communication between the accumulator 30 and the axial passage 84 is blocked, while fluid communication between the line 106 and the axial passage 84 is allowed. With such an embodiment, the valve 117 may be configured in position 117*a* during normal operation and may be moved into position 117*b* by the controller, for example when (a) the pressure sensor 119*a* indicates that the pressure in line 106 (from the pump 26) exceeds a threshold pressure, and (b) the pressure sensor 119*b* indicates that the pressure in line 107 (from the accumulator) is less than the pressure in line 106. Alternatively, an operator may selectively position the valve 117, via the controller 115, into position 117*b*, as described above with respect to valves 112' and 114.

Figure 6:
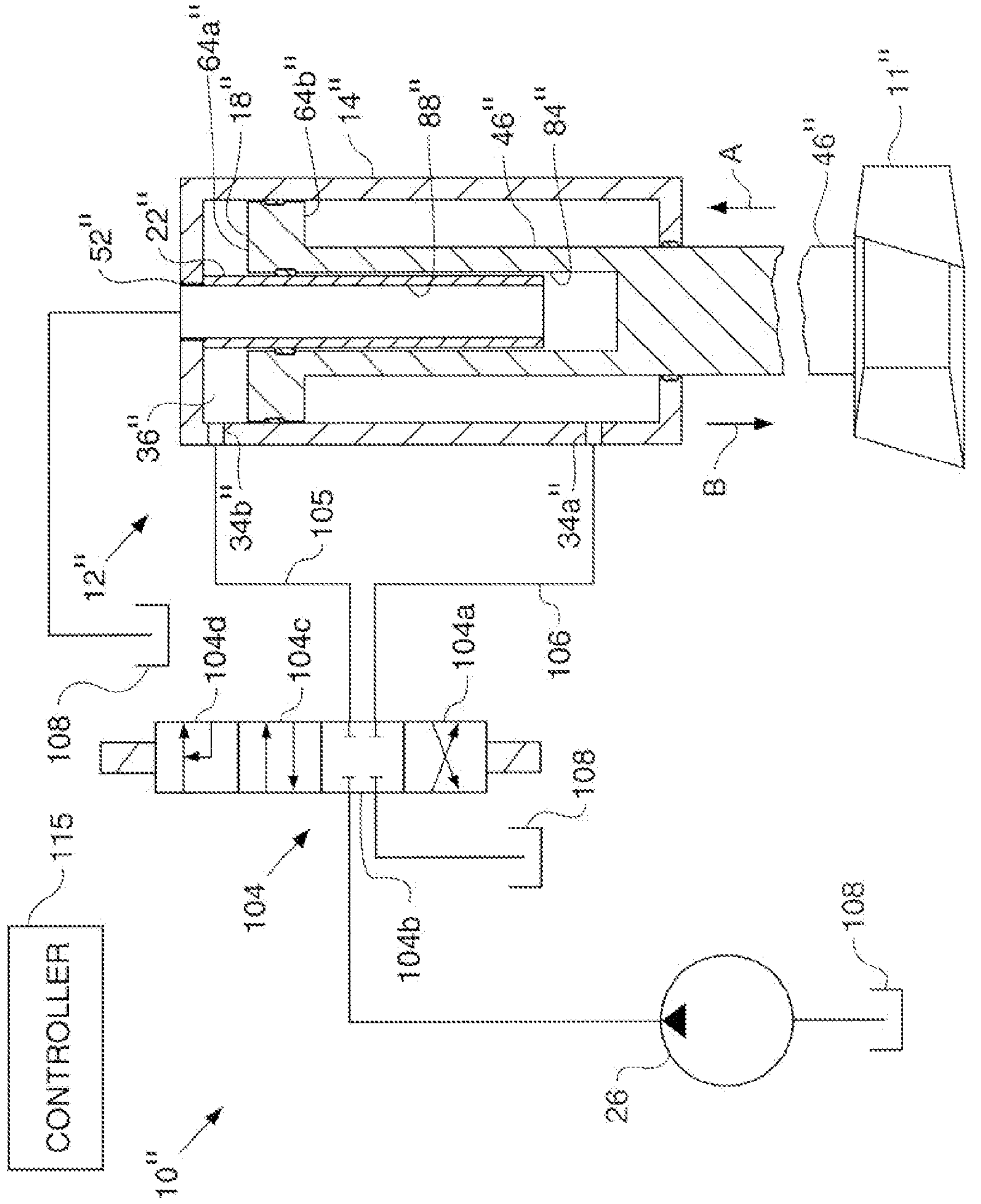
FIG. 6 is a partial diagrammatic and partial schematic view of a fifth exemplary fluid actuation system in accordance with the present invention.

Referring to FIG. 6, an alternative embodiment of an exemplary fluid actuation system 10" is shown. The system 10" may include many of the same features of the system 10 shown in FIG. 1, such as a source of pressurized fluid 26 (e.g., a fluid pump) and a valve member 104 (e.g., an electro-hydraulic valve). The system 10" of FIG. 6, however, may be configured and arranged so that the cylinder arrangement 12" and its various components (e.g., the cylinder body 14", the piston and rod assembly 18" and the tubular element 22") are turned upside down with respect to the components shown in FIG. 1. Moreover, the tubular element 22" may be fluidly connected with a fluid reservoir or tank 108 instead of an accumulator.

With continued reference to FIG. 6, the fluid pump 26 may be fluidly connected with the cylinder body 14" at ports 34*a*", 34*b*" and may provide pressurized fluid to the ports 34*a*", 34*b*" through the valve member 104. The valve member 104 shown in FIG. 6 is a proportional four position electro-hydraulic valve and may be controlled to selectively (i) supply a desired flow of pressurized fluid from the pump 26 to the port 34*a*" of the cylinder body 14"; (ii) block pressurized fluid from passing from the pump 26 to the cylinder body 14"; (iii) supply a desired flow of pressurized fluid from the pump 26 to the port 34*b*" of the cylinder body 14"; and (iv) supply fluid from the pump 26 and from the port 34*a*" to the port 34*b*" of the cylinder body 14".

For example, when the valve 104 is moved away from position 104*b* and toward position 104*a*, the pump 26 supplies pressurized fluid to the port 34*a*" of the cylinder body 14". The pressurized fluid operates against the rod side 64*b*"

of the piston and rod assembly 18", thus causing the piston and rod assembly 18" to move axially in the direction of arrow A in FIG. 6 and, for example, causing a work implement 11" (such as the blade of a dozer) connected to the piston and rod assembly 18" to be lifted. As the piston and rod assembly 18" is moved in the direction of arrow A within the cylinder body 14", fluid is discharged from the cylinder body 14" at the port **34*b*" and is passed through the valve 104 into the fluid reservoir or tank 108. When the valve 104 is moved away from position 104*b* and toward position 104*c*, the pump 26 supplies pressurized fluid to the port 34*b*" of the cylinder body 14". The pressurized fluid operates against the head side 64*a*" of the piston and rod assembly 18", thus forcing the piston and rod assembly to move in the direction of arrow B in FIG. 6 and, for example, causing a work implement 11" (such as the blade of a dozer) connected to the piston and rod assembly 18" to be lowered. As the piston and rod assembly 18" is moved in the direction of arrow B within the cylinder body 14", fluid is discharged from the cylinder body 14" at the port 34*a*" and is passed through the valve 104 into the tank 108**.

When the valve 104 is moved from position **104*b* toward position 104*d* and beyond position 104*c*, fluid from the pump 26 and from the port 34*a*" may be directed to port 34*b*" of the cylinder body 14" to cause the piston and rod assembly 18" to move in the direction of arrow B in FIG. 6. For example, when it is desired to quickly move the piston and rod assembly 18" in the direction of arrow B—e.g., during a "quick-drop" operation wherein the work implement 11" is quickly lowered—valve 104 may be moved toward position 104*d* and beyond position 104*c*. Thus, as the work implement 11" is lowered, fluid is forced from port 34*a*", through the valve 104, and into port 34*b*" of the cylinder assembly 14". As a result, the pump 26 may provide a lesser amount of fluid to port 34*b*"** during the lowering operation.

As shown in FIG. 6, the tubular element 22" may be fluidly connected, for example at the opening or port 52", with a source of fluid 108, such as the fluid reservoir or tank 108. Thus, when the piston and rod assembly 18" is moved in the direction of arrow A, fluid disposed within the axial passage 84" is discharged from the axial passage 84" through the fluid passage 88" of the tubular element 22" and is transmitted to the tank 108. When the piston and rod assembly 18" is moved in the direction of arrow B, fluid from the tank 108 is drawn into the axial passage 84" through the fluid passage 88" of the tubular element 22".

The embodiment of FIG. 6 may be applied, for example, to dozers or other earthworking machines to provide such advantages as reducing pump output requirements. Earthworking machines, such as dozers or the like, may include a cylinder arrangement wherein a work implement is lifted (i.e., moved in the direction of arrow A in FIG. 6) via a piston and rod assembly by applying pressurized fluid to the rod side of the piston and rod assembly and wherein the work implement is lowered (i.e., moved in the direction of arrow B in FIG. 6) by applying pressurized fluid to the head side of the piston and rod assembly. In such machines, the pump may be sized so that a fast implement lowering speed may be achieved. In such systems, the pump may be sized to fill the entire head side of an internal cavity of a cylinder body during the lowering operation. In the embodiment shown in FIG. 6, however, the output requirement of the pump 26 during a lowering operation may be reduced since the tubular element 22" fills a portion of the head side of the internal cavity 36". For example, during an implement lowering operation, the pump 26" (in combination with fluid from the port **34*a*" when the valve 104 is in position 104*d*) only needs to fill the head side of the internal cavity 36" minus the volume of the internal cavity 36" occupied by the tubular element 22" and the fluid inside the tubular element 22". Thus, the pump 26 shown in FIG. 6** may perform a fast implement lowering operation while providing a lesser flow rate of pressurized fluid than a pump on a conventional dozer or other similarly arranged machine.

INDUSTRIAL APPLICABILITY

The present invention may be used to recover energy from and return energy to components of a fluid actuation system, thus reducing overall energy expenditures for the system. During operation of the exemplary fluid actuation systems 10 of FIGS. 1-5, the valve 104 may be used to control the application of pressurized fluid from the pump 26 to the cylinder body 14 through ports **34*a*, 34*b*. Application of the pressurized fluid to port 34*a* will cause the piston and rod assembly 18 to be moved within the cylinder body 14 to, for example, lift a work implement 11 connected with the piston and rod assembly 18. When the work implement 11 and the piston and rod assembly 18 are lowered, energy is stored (in the form of pressurized fluid) within the accumulator 30 and is available for the next lifting operation. The accumulator 30 may provide pressurized fluid to the axial passage 84 of the piston and rod assembly 18 to assist with subsequent lifting operations. As a result of the lift assistance provided by the accumulator 30 to the piston and rod assembly 18, the pump 26 may consume less energy when periodically lifting and lowering a work implement 11 via the piston and rod assembly 18, and overall fuel consumption by the system 10** may be decreased.

In addition, the present invention may reduce pump 26 output requirements. For example, the presence of the tubular element 22 within the internal cavity 36 of the cylinder body 14 allows a lesser volume of fluid to be provided (from the pump 26) to lift the piston and rod assembly 18 (FIGS. 1-5) or lower the piston and rod assembly 18" (FIG. 6). Therefore, assuming a constant flow rate of fluid is provided by the pump 26, the piston and rod assembly 18 may be lifted (or lowered) faster with the disclosed exemplary embodiments than if the tubular element 22 were not present within the internal cavity 36 of the cylinder body 14.

During operation of the exemplary fluid actuation system 10 disclosed herein, pressurized fluid from the pump 26 may be provided simultaneously to the port **34*a* of the cylinder body 14 and to the axial passage 84 of the piston and rod assembly, thereby increasing the overall force exerted by pressurized fluid on the piston and rod assembly 18. For example, when a heavy, fully loaded work implement is to be lifted, very high pressure fluid may be provided by the pump 26 into the port 34*a* of the cylinder body 14. The high pressure of the fluid may exceed a threshold pressure to open control valve 112, and the highly pressurized fluid may be supplied to the axial passage 84, thereby increasing the overall lifting force exerted on the piston and rod assembly 18. Moreover, when an electro-hydraulic control valve 112' is used, an operator may selectively apply pressurized fluid from the pump 26 to the axial passage 84. In such an embodiment, an operator may selectively choose to operate the actuation system 10 in a fast cycle mode (wherein control valve 112' is closed) to increase productivity, or the operator may choose to operate the system 10 in a slower, higher-lifting-force mode (wherein control valve 112' is open and pump fluid is being supplied to the axial passage 84**).

It should be appreciated that the present system 10 may allow the usage of a single cylinder body 14 that includes a first lift arrangement, wherein pressurized fluid from the pump 26 is supplied to port **34*a* of the cylinder body 14, and a second lift arrangement, wherein an accumulator 30** provides an energy conservation function. Moreover, the single cylinder body assembly may be used to replace a conventional cylinder without a significant layout redesign of the subject machine to which it will be applied.

From the foregoing it will be appreciated that, although specific embodiments of the invention have been described herein for purposes of illustration, various modifications may be made without deviating from the spirit or scope of the invention. Other embodiments of the invention will be apparent to those skilled in the art from consideration of the specification and figures and practice of the invention disclosed herein. It is intended that the specification and disclosed examples be considered as exemplary only, with a true scope and spirit of the invention being indicated by the following claims and their equivalents. Accordingly, the invention is not limited except as by the appended claims.

What is claimed is:

1. A cylinder assembly comprising:
- a cylinder body including an internal cavity therein;
- a piston and rod assembly disposed for axial movement within the internal cavity of the cylinder body, the piston and rod assembly having an axial passage extending therein;
- a hydraulic fluid pump for supplying pressurized fluid to a plurality of ports in fluid communication with the internal cavity of the cylinder body;
- a tubular element received within the axial passage of the piston and rod assembly, at least a portion of the tubular element extending out of the axial passage and into the internal cavity of the cylinder body between the axial passage and a wall of the cylinder body; and
- an accumulator;
- wherein the tubular element includes a fluid passage therein, the fluid passage fluidly communicating the axial passage of the piston and rod assembly with the accumulator, and through a valve with the hydraulic fluid pump.

2. The cylinder assembly of claim 1, wherein the tubular element is slidably received within the axial passage of the piston and rod assembly and is affixed to or integrally formed with the cylinder body.

3. The cylinder assembly of claim 1, wherein:
- the cylinder body has a first end and a second end, the first end having an opening therein;
- a portion of the piston and rod assembly extends through the opening in the first end of the cylinder body; and
- the tubular element extends into the internal cavity of the cylinder body between the axial passage and the second end of the cylinder body.

4. The cylinder assembly of claim 3,
- wherein the tubular element is affixed to the second end of the cylinder body and is slidably and sealingly received within the axial passage of the piston and rod assembly.

5. The cylinder assembly of claim 1, including:
- a fluid reservoir fluidly connected to the accumulator; and
- a valve disposed between the accumulator and the fluid reservoir, the valve being operable to prevent fluid passage from the accumulator to the fluid reservoir when the accumulator pressure is below a threshold pressure.

6. A fluid system comprising:
- a cylinder body including an internal cavity therein;
- a piston and rod assembly disposed for axial movement within the internal cavity of the cylinder body, the piston and rod assembly having an axial passage extending therein, the piston and rod assembly including a piston having a rod side and a head side;
- a tubular element received within the axial passage of the piston and rod assembly, at least a portion of the tubular element extending out of the axial passage and into the internal cavity of the cylinder body between the axial passage and a wall of the cylinder body, the tubular element having a fluid passage therein;
- a source of fluid in fluid communication with the head side of the piston;
- a source of fluid in fluid communication with the axial passage of the piston and rod assembly through the fluid passage of the tubular element, and
- a control valve, wherein the axial passage of the piston and rod assembly is also fluidly connected through the control valve with the source of fluid in fluid communication with the head side of the piston.

7. The fluid system of claim 6, wherein the source of fluid in fluid communication with the head side of the piston is a fluid pump.

8. The fluid system of claim 6, wherein one source of fluid in fluid communication with the axial passage of the piston and rod assembly through the fluid passage of the tubular element is an accumulator.

9. The fluid system of claim 8, wherein the source of fluid in fluid communication with the head side of the piston is a fluid pump.

10. The fluid system of claim 9, wherein the control valve is operable to prevent or restrict fluid from passing from the fluid pump to the axial passage of the piston and rod assembly when the pressure of fluid from the fluid pump is below a threshold pressure.

11. The fluid system of claim 9, wherein the control valve is an electro-hydraulic valve that is operable to selectively control the passage of fluid between the fluid pump and the axial passage of the piston and rod assembly.

12. The fluid system of claim 6 wherein the control valve is operable to (i) prevent or restrict fluid from passing from the source of fluid in fluid communication with the head side of the piston to the axial passage of the piston and rod assembly when the pressure of fluid coming from the source of fluid in fluid communication with the head side of the piston is below a threshold pressure, and (ii) allow fluid to pass from the source of fluid in fluid communication with the head side of the piston to the axial passage of the piston and rod assembly when the pressure of the fluid coming from the source of fluid in fluid communication with the head side of the piston exceeds a threshold pressure.

13. The fluid system of claim 8, further comprising:
- a second control valve operable to block fluid communication between the accumulator and the axial passage of the piston and rod assembly.

14. A method for actuating a fluid actuator including a cylinder body with an internal cavity therein, and a piston and rod assembly having an axial passage extending therein, the piston and rod assembly being disposed for axial movement within the internal cavity of the cylinder body, the method comprising:
- creating a first urging force on the piston and rod assembly in an axial direction by directing pressurized fluid from a fluid source into the cylinder body and upon a first side of a piston of the piston and rod assembly;
- creating a second urging force on the piston and rod assembly in the axial direction by directing pressurized fluid from a source of fluid into the axial passage of the piston and rod assembly as the piston and rod assembly moves in the axial direction;
- preventing the pressurized fluid that is creating the first urging force on the piston and rod assembly from substantially communicating within the cylinder body with the fluid within the axial passage of the piston and rod assembly;

preventing the pressurized fluid that creates the first urging force from contributing to the second urging force when the pressure of the pressurized fluid that creates the first urging force is below a threshold pressure; and allowing the pressurized fluid that creates the first urging force to contribute to the second urging force when the pressure of the pressurized fluid that creates the first urging force exceeds a threshold pressure.

15. The method of claim 14, wherein the step of creating a second urging force on the piston and rod assembly includes directing pressurized fluid through a tubular element slidably disposed within the axial passage of the piston and rod assembly and extending out of the axial passage and into the internal cavity of the cylinder body between the axial passage and a wall of the cylinder body.

16. The method of claim 14, including:

eliminating or reducing the first urging force; and directing fluid from the axial passage of the piston and rod assembly to a fluid reservoir.

17. The method of claim 16, wherein the step of directing fluid from the axial passage of the piston and rod assembly includes directing fluid from the axial passage of the piston and rod assembly to an accumulator.

18. The method of claim 14, including:

eliminating or reducing the first urging force; and directing fluid from the axial passage of the piston and rod assembly to a fluid reservoir through a tubular element slidably disposed within the axial passage of the piston and rod assembly and extending out of the axial passage and into the internal cavity of the cylinder body between the axial passage and a wall of the cylinder body.

19. The method of claim 18, wherein the step of directing fluid from the axial passage of the piston and rod assembly to a fluid reservoir includes directing fluid from the axial passage of the piston and rod assembly to an accumulator.

20. The method of claim 14, including using the first urging force to lift a work implement.

21. The method of claim 14, including using the first urging force to lower a work implement.

22. The method of claim 14, including directing fluid out of a first port of the cylinder body, into a second port of the cylinder body, and toward the first side of the piston of the piston and rod assembly.

* * * * *